(12) United States Patent
Nitz et al.

(10) Patent No.: US 8,616,165 B2
(45) Date of Patent: Dec. 31, 2013

(54) ARRANGEMENT FOR COUPLING TWO COMPONENTS OF AN INTERNAL COMBUSTION ENGINE ARRANGED MOVABLE RELATIVE TO EACH OTHER

(75) Inventors: Norbert Nitz, Erlangen (DE); Stefan Gemein, Furth (DE); Joachim Krause, Obermichelbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 154 days.

(21) Appl. No.: 13/238,746

(22) Filed: Sep. 21, 2011

(65) Prior Publication Data
US 2012/0073530 A1    Mar. 29, 2012

(30) Foreign Application Priority Data
Sep. 24, 2010 (DE) .................. 10 2010 046 434

(51) Int. Cl.
*F01L 1/34* (2006.01)
(52) U.S. Cl.
USPC ..................................... 123/90.17; 123/90.15

(58) Field of Classification Search
USPC ............... 123/90.17, 90.16, 90.15, 90.31
See application file for complete search history.

(56) References Cited

U.S. PATENT DOCUMENTS

| 7,270,096 B2 * | 9/2007 | Lancefield et al. ........ 123/90.17 |
| 2004/0139937 A1 * | 7/2004 | Ichinosawa ................ 123/90.17 |

FOREIGN PATENT DOCUMENTS

| DE | 10-2006-057-895 A1 | 6/2008 |
| WO | 2008/068251 A1 | 6/2008 |

* cited by examiner

*Primary Examiner* — Zelalem Eshete
(74) *Attorney, Agent, or Firm* — Volpe and Koenig, P.C.

(57) ABSTRACT

An arrangement for coupling two components of an internal combustion engine that are arranged movable relative to each other is provided, in particular, for switching multi-stage valve drives, with at least one coupling element (1) arranged to be movable in one of the components for coupling with the other component to be coupled. Here, at the contact point between the coupling element (1) and the component to be coupled, a force acting on the coupling element (1) during coupling is introduced at an angle relative to the coupling direction (2) of the coupling element (1).

10 Claims, 4 Drawing Sheets

ARRANGEMENT FOR COUPLING TWO COMPONENTS OF AN INTERNAL COMBUSTION ENGINE ARRANGED MOVABLE RELATIVE TO EACH OTHER

CROSS-REFERENCE TO RELATED APPLICATIONS

This application claims the benefit of German Patent Application No. 102010046434.1, filed Sep. 24, 2010, which is incorporated herein by reference as if fully set forth.

BACKGROUND

The invention relates to an arrangement for coupling two components of an internal combustion engine that are arranged movable relative to each other, in particular, for switching multi-stage valve drives, with at least one coupling element that is arranged movable in one of the components for coupling with the other component to be coupled.

Such an arrangement is used, in particular, as a locking mechanism in switchable cam followers of multi-stage valve drives. In DE 10 2006 057 895 A1, a switchable rocker arm of a valve drive of an internal combustion engine is described in which, for switching the rocker arm, a coupling mechanism is provided. Through the use of the coupling mechanism, levers of the rocker arm, the so-called inner lever and the so-called outer lever, which are supported one inside the other and are movable relative to each other, can be coupled to each other. For this purpose, in a hole on the inner lever, a coupling piston is arranged movable and can be displaced by charging with hydraulic medium in the coupling direction and can be coupled on a complementary catch surface on the outer lever.

SUMMARY OF THE INVENTION

Therefore the invention is based on the objective of allowing, in an arrangement of the type named above, a reduction of the coupling play and the wear, as well as a simple and economic production. This objective is met by the invention.

According to the invention, the coupling element and/or the component to be coupled are constructed such that, at the contact point for coupling, the force on the coupling element can be introduced directed at an angle against the coupling direction of the coupling element. In this way, the necessary coupling clearance of the arrangement is minimized and impacts during coupling are avoided and wear is reduced. Simultaneously, in the processing of the coupling faces at the contact point of the coupling element and the component to be coupled, a lower accuracy is required, thereby the production costs can be lowered.

In one preferred construction, the component to be coupled has, at the contact point, a flat coupling face oriented at an angle against the coupling direction of the coupling element. Advantageously, at the contact point, the coupling element forms an outer cone tapering in the coupling direction. Preferably, the cone angle on the coupling element and the angle of inclination of the coupling face on the component to be coupled are of equal or approximately equal size. Here, the angle of inclination and cone angle are advantageously selected so that, on one hand, self-clamping on the coupling element does not occur and, on the other hand, the coupling element is not unintentionally pushed back in the decoupling direction.

Alternatively, at the contact point on the coupling element, a flat coupling face oriented inclined at an angle in the coupling direction of the coupling element could be provided. Preferably, the coupling faces are oriented parallel or approximately parallel to each other. The angle of inclination of the coupling faces is advantageously selected so that self-clamping and unintentional decoupling of the arrangement cannot take place. It is also conceivable that, at the contact point, several flat coupling faces are provided that are adjacent to each other in the coupling direction and are oriented inclined at an angle in the coupling direction of the coupling element. Preferably, the coupling faces are constructed with an angle of inclination increasing in the coupling direction. They could form a cut profile similar to the form of a linear spline function in the coupling direction.

Another alternative construction of the invention provides, at the contact point on the coupling element, a rounding extending in the coupling direction. This could be curved, in particular, cylindrically in the coupling direction or alternatively could have a spherical curvature. Also conceivable is a variable, especially ellipse-shaped curvature in the coupling direction.

According to another embodiment of the invention that could be constructed both independently and also in combination with the features described above, the coupling element is constructed in multiple parts and has at least two parts guided movably relative to each other on guide sections in the coupling direction. Advantageously, in this way, at least one damping element is arranged in the flow of forces between the parts for transferring a coupling movement of the coupling element.

Preferably, the parts engage on the guide sections one in the other in a complementary way. Advantageously, for transferring the coupling movement, the damping element is arranged between the guide sections. Preferably, as the damping element, a compression spring is provided that is arranged coaxial to the guide sections and is supported at its end areas on each guide section.

Here it is advantageous when a catch stop is provided on this coupling element for limiting the relative movement of the parts of the coupling element. The catch stop allows a simultaneous resetting of both parts of the coupling element, in particular, for decoupling the arrangement, by resetting only one part. In addition, the catch stop could also be used as a captive lock for both parts of the coupling element. Preferably, the catch stop is constructed on the guide sections. To this end, a recess that is wide in the movement direction of the coupling element is formed advantageously in one of the guide sections, wherein a ring engages in this recess, with this ring being guided projecting into a complementary, peripheral groove on the other guide section.

According to another embodiment of the invention that could be constructed both independently and also in combination with the features described above, the movement of the coupling element in the coupling direction can be delayed by damping directly before contact with the component to be coupled. In this way, an especially soft coupling is achieved.

A mechanical damping of the movement of the coupling element for the coupling could be achieved in a simple way by at least one elastically pliant stop arranged in the coupling path of the coupling element.

Preferably, the stop is constructed as a movable ring arranged coaxial in the coupling path of the coupling element and spring-loaded in the coupling direction.

Alternatively, at least one plate spring could be provided arranged coaxial in the coupling path of the coupling element. Preferably, for coupling in the contact phase with the component to be coupled, the coupling element can be placed on the radial inner, elastic edge of the plate spring projecting against the coupling direction.

It is also conceivable to arrange one or more bumpers constructed from elastic material, in particular, a rubber bumper constructed from an elastomer, as a stop for damping the coupling movement accordingly in the coupling path.

In another variant of the invention, at least one bow spring is provided that is connected rigidly to the component to be coupled and has an elastic, free end section that is arranged in the coupling path of the coupling element transverse to the coupling direction and on which the coupling element impacts during coupling in the contact phase.

According to another concept of the invention that could be constructed both independently and also in combination with the features described above, the movement of a coupling element that can be actuated by pressurized medium and is arranged in one of the components can be delayed during the coupling by hydraulic damping in the contact phase. To this end, in the contact phase for the hydraulic damping of the coupling movement of the coupling element, the cross-sectional flow between the component and the coupling element arranged movably in this component is narrowed section by section, wherein the flow of pressurized medium emerging during the coupling due to displacement is throttled. In this way, due to the throttling effect, a force opposite the coupling movement is generated at the narrowing and therefore the coupling is delayed.

BRIEF DESCRIPTION OF THE DRAWINGS

Additional features of the invention are given from the following description and from the drawings in which several embodiments of the invention are shown simplified. Shown are.

DETAILED DESCRIPTION OF THE PREFERRED EMBODIMENTS

Figure 1:
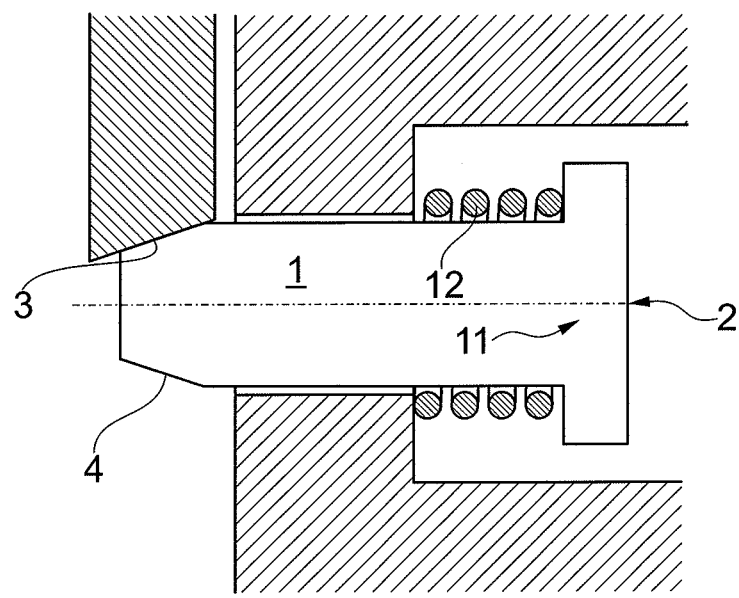
FIG. 1 is a section diagram of an arrangement according to the invention in a first embodiment.

The embodiments in FIGS. 1 to 8 show arrangements according to the invention for coupling two components arranged movable relative to each other, with each having a coupling element 1 that is movably positioned in a holder in one of the components for coupling with the other component to be coupled. The components are here arranged movable relative to each other, here, for example, vertically in the plane of the picture. For coupling, the coupling element 1 can be loaded at the end area 11 facing away from the component to be coupled with a force in the coupling direction 2 and therefore is movable guided in the holder in the coupling direction 2 until the coupling element and its counterpart contact each other at a contact point. In the coupled state, the components are movable only together. For decoupling the components, a restoring force is applied on the coupling element 1 in the decoupling direction opposite the coupling direction 2.

The invention can be used, in particular, in switchable cam followers of multi-stage valve drives, such as, e.g., switchable cup tappets, switchable support elements, switchable roller tappets, and switchable levers, especially rocker arms and fingers. In the following, the arrangement according to the invention will be described, for example, as a locking device for switching a switchable rocker arm in a valve drive of an internal combustion engine. Here, the components that can be coupled by the arrangement according to the invention are constructed as two levers supported one in the other, the so-called inner lever and the so-called outer lever, of the rocker arm. The inner and outer levers transfer strokes from a not-shown camshaft to one or more not-shown gas-exchange valves of the internal combustion engine. For transferring different valve strokes (stroke switching) and/or for transferring no valve stroke (zero stroke, valve shutdown), the levers can be coupled or decoupled by the arrangement according to the invention. For coupling, the coupling element 1 constructed as a locking piston can be loaded on the end area facing away from the contact point with pressurized medium in the coupling direction 2. As the pressurized medium, the oil from the engine-oil circuit of the internal combustion engine is typically used. For restoring the coupling movement, a resilient element is provided, here, a restoring spring 12 that is arranged coaxial to the coupling element 1 and is constructed as a helical compression spring, with the resilient element being biased in the coupling direction 2 by the coupling movement of the coupling element 1 and in this way loads the coupling element 1 with a restoring spring force in the decoupling direction. To this end, the restoring spring 12 is supported, on one side, in the coupling direction 2 on the inner lever and, on the other side, in the decoupling direction on the end area 11 of the coupling element 1 extended like a piston transverse to the movement axis. Alternatively, the restoring of the coupling element 1 could be carried out on the end area 11 facing away from the contact point through forced pushback, in particular, controlled by a cam. It is conceivable that both the coupling and also decoupling are carried out by loading with the pressurized medium. Furthermore, as shown here, coupling can be performed with a coupling element 1 arranged movable in the inner lever from the inside to the outside with the outer lever. Alternatively, in kinematic reversal it is possible to perform coupling with a coupling element 1 arranged movable in the outer lever from the outside to the inside with the inner lever. It is further conceivable to perform coupling or decoupling in a non-pressurized/signal-free way.

The coupling element 1 and the component to be coupled are constructed such that, for coupling at the contact point between the coupling element 1 and component to be coupled, the force acting on the coupling element 1 can be introduced directed at an angle against the coupling direction 2. Here, the force engaging at the contact point is divided into a contact force acting normal to the surface and a contact force acting tangential to this surface or into a contact force acting on the surface on the coupling element 1. The force acting on the coupling element 1 during coupling has a force component directed against the coupling movement of the coupling element 1. In this way, the loading on the coupling element 1 can be reduced significantly transverse to the coupling movement.

Figure 2:
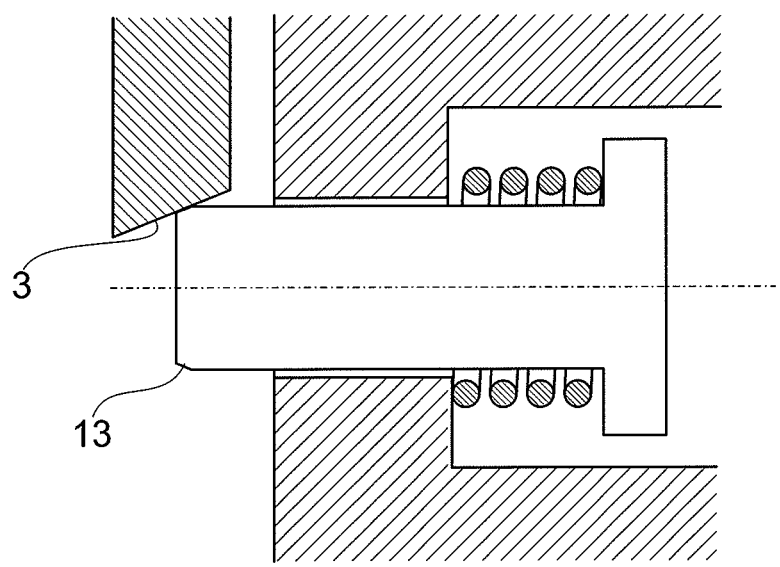
FIG. 2 is a section diagram of an arrangement according to the invention in a second embodiment.
Figure 3:
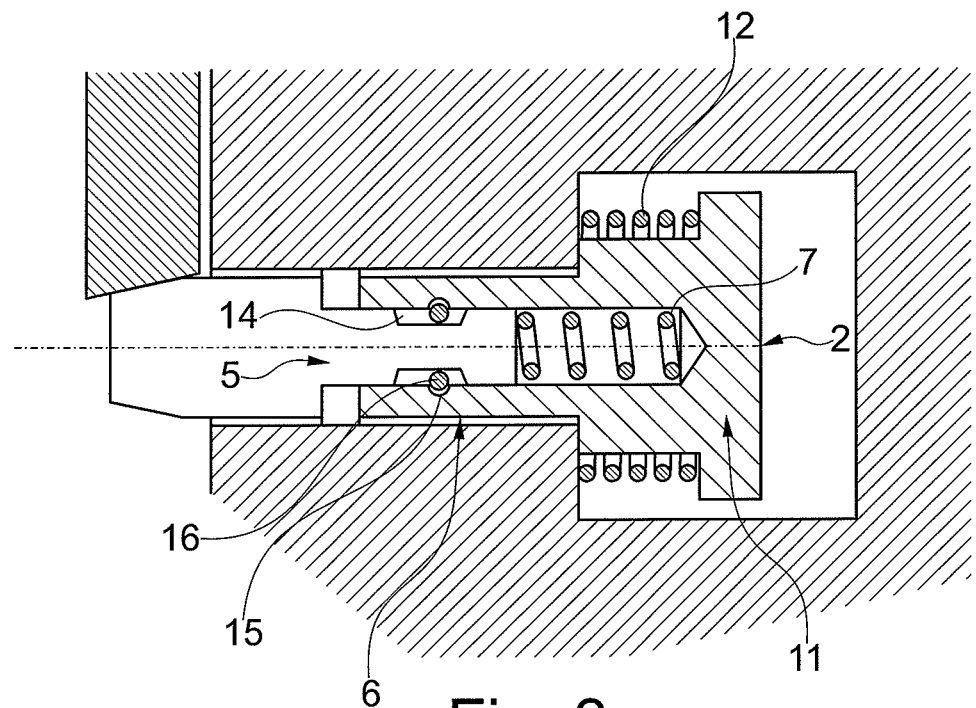
FIG. 3 is a section diagram of an arrangement according to the invention in a third embodiment.
Figure 4:
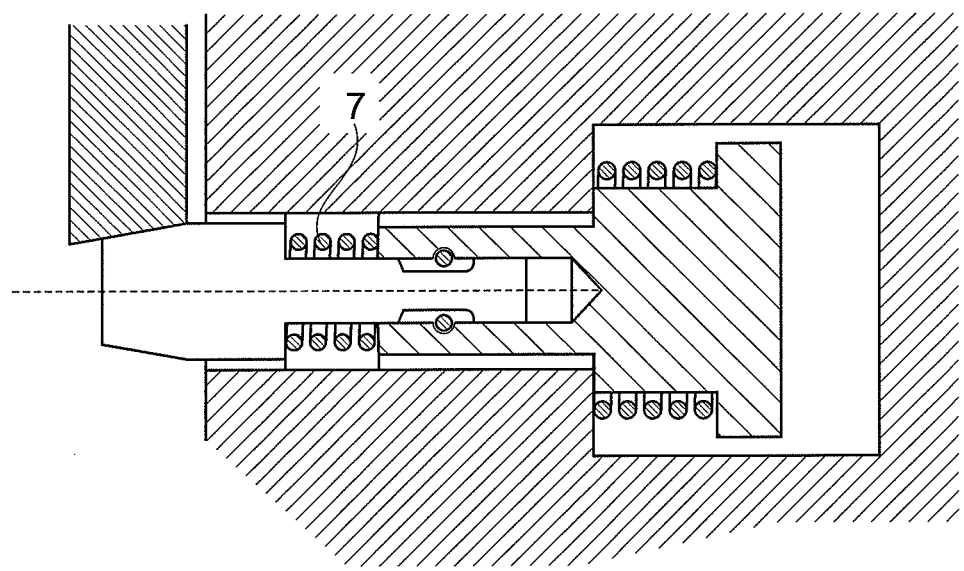
FIG. 4 is a section diagram of an arrangement according to the invention in a fourth embodiment.

FIGS. 1 and 2, as well as FIGS. 5 to 8, show different constructions with the coupling element 1 constructed in one part and each of FIGS. 3 and 4 shows a construction with a two-part coupling element. All of the illustrated variants could also be combined with each other.

In FIGS. 1 and 3 to 8, an outer cone 4 tapering in the coupling direction 2 is provided for coupling on the coupling element 1 at the contact point. At the contact point of the outer lever, this cone interacts with a flat coupling face 3 that is oriented inclined at an angle against the coupling direction 2 of the coupling element 1. Ideally, the outer cone 4 and coupling face 3 are constructed complementary to each other with equal size cone angle and angle of inclination. The cone angle and angle of inclination are here selected advantageously so that, on one hand, due to the friction forces at the contact point, self-clamping does not occur on the coupling element 1 and, on the other hand, the coupling element 1 is not unintentionally unlocked or pushed back.

FIG. 2 shows, in another construction according to the invention, the coupling element 1 at the contact point with a rounding 13 that extends in the coupling direction 2 and interacts with the inclined coupling face 3 on the outer lever from FIG. 1.

In FIGS. 3 and 4, the coupling element 1 is constructed in two parts, namely a first part that has the contact point for coupling with the outer lever and a second part that has the piston-shaped end area 11. The two parts of the coupling element 1 engage in each other on complementary guide sections 5, 6 and are guided movable relative to each other on these guide sections in the coupling direction 2 and decoupling direction. The first part has a centrally projecting guide section 5 that engages in a complementary central holder on the guide section 6 of the second part. The parts are coupled with each other via a damping element 7, here, a helical compression spring, arranged in the flow of forces between the parts. The helical compression spring is arranged coaxial to the guide sections 5, 6 and is supported on each of its end regions on one of the guide sections 5, 6. In this way, the force or movement transfer for coupling with the outer lever takes place on the coupling element 1 via the helical compression spring of the damping element 7 that is here compressed in the coupling direction 2 and thus acts in a damping manner.

On the guide sections 5, 6, a catch stop is provided. To this end, the guide section 5 of the first part has a recess 14 extending peripherally in the circumferential direction and constructed wide in the movement direction of the coupling element. Simultaneously, a groove 15 extending peripherally in the circumferential direction is constructed on the inner wall of the central holder on the guide section 6 of the second part, wherein a ring 16, for example, a wire ring, is guided projecting inward in this groove. The ring 16 here engages in the recess 14 on the first part. For a relative movement of the parts during decoupling, the ring 16 impacts on the side wall of the recess 14 facing the piston-shaped end area 11 of the second part. For decoupling the arrangement, both parts of the coupling element 1 can be reset simultaneously on the catch stop by the restoring force of the restoring spring 12 acting on the piston-shaped end area 11 of the second part. In addition, the catch stop could be used as captive lock for the two parts of the coupling element 1. In this embodiment, each of the two parts of the coupling element 1 preferably has a circular cross section. It is also conceivable that both of the parts or one of the parts are/is constructed with non-circular cross sections, in particular, polygonal, for example, rectangular cross sections.

In FIG. 3, the helical compression spring of the damping element 7 is arranged coaxial in the holder on the guide section of the second part and is supported, on one side, on the end of the holder and, on the other side, on the end of the central guide section 5 of the first part engaging in this holder.

FIG. 4 shows a construction in which the damping element 7 is arranged coaxial on the centrally projecting guide section 5 of the first part. This is supported, on one side, on a projection formed by the centrally projecting guide section 5 on the first part and, on the other side, on the end of the guide section 6 of the second part.

In FIGS. 5 to 8, the coupling movement of the coupling element 1 is delayed in the contact phase with the component to be coupled, here the outer lever. To this end, the coupling movement is damped shortly before the contact with the outer lever and therefore guarantees a soft, impact-free coupling. In this way, the coupling is carried out in two phases. In a first phase, the largest part of the coupling path (ca. 50%-80%) until shortly before contact with the coupling face 3 is carried out within one cam revolution of the camshaft and the rest of the coupling path in a second phase during the contact is covered in a delayed manner in a few additional revolutions.

Figure 5:
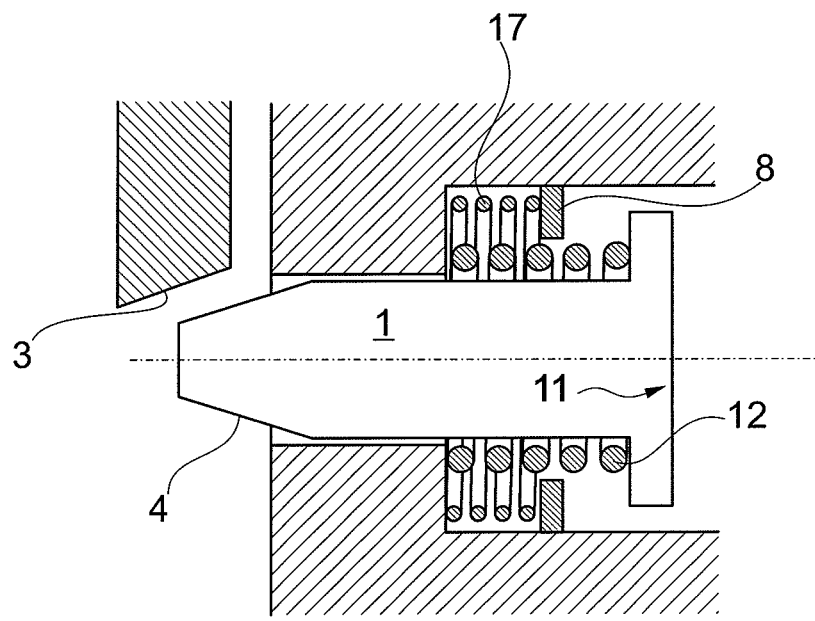
FIG. 5 is a section diagram of an arrangement according to the invention in a fifth embodiment.
Figure 6:
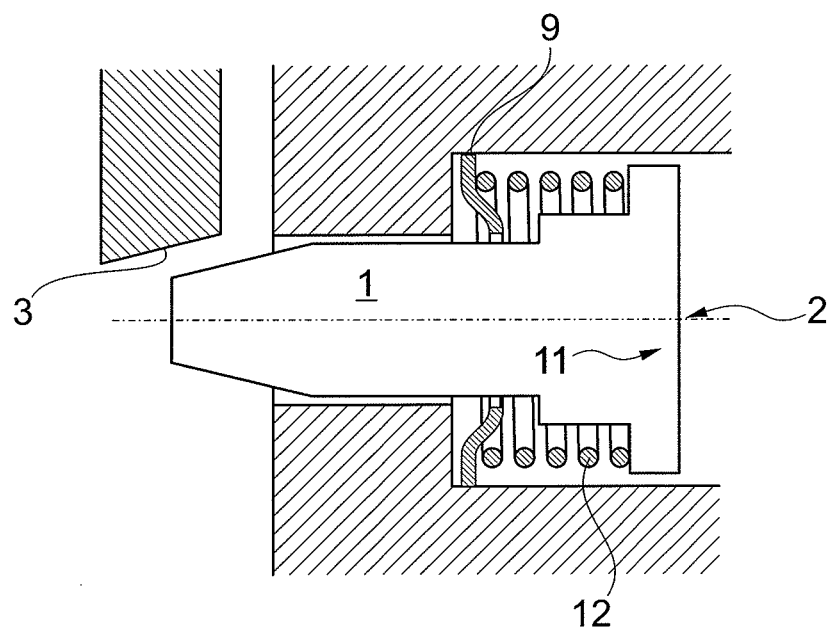
FIG. 6 is a section diagram of an arrangement according to the invention in a sixth embodiment.
Figure 7:
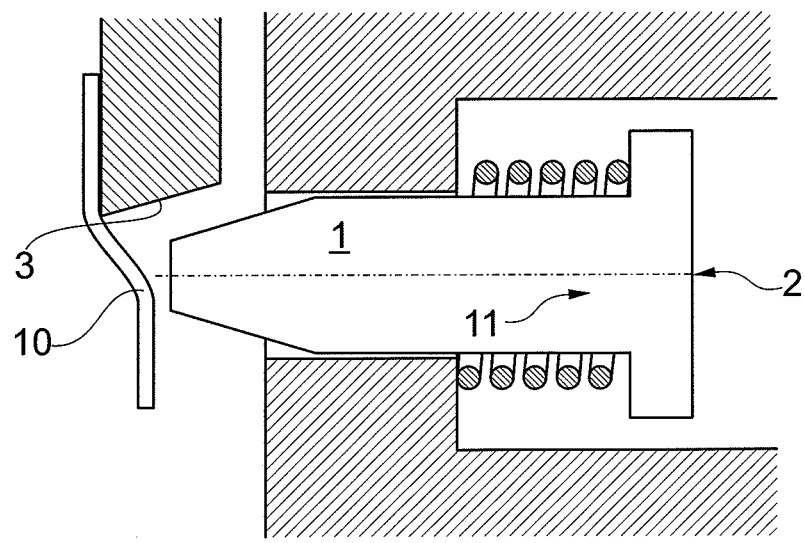
FIG. 7 is a section diagram of an arrangement according to the invention in a seventh embodiment.

For mechanical damping of the coupling movement of the coupling element 1 in the contact phase with the component to be coupled, in the constructions according to FIGS. 5 to 7, at least one elastically pliant stop is provided that acts in the coupling direction 2 and on which the coupling element 1 can be placed. In the construction according to FIG. 5, the stop is formed by a ring 8 that is arranged in the coupling path of the piston-shaped end area 11 of the coupling element 1. The ring 8 is here spring-loaded in the coupling direction 2 by a helical compression spring 17 arranged coaxial to the coupling element 1 and the restoring spring 12. For damping, the helical compression spring 17 has a greater spring stiffness than the restoring spring 12 and is supported with its end areas, on one side, on the inner lever and, on the other side, on the ring 8. The ring 8 interacts with the piston-shaped end area 11 on the coupling element 1. To this end, the ring 8 is positioned in the coupling path of the end area 11 such that, for coupling at the contact point, shortly before contact of the outer cone 4 of the coupling element 1 with the coupling face 3 of the outer lever, the end area 11 impacts on the ring 8 and here the helical compression spring 17 is compressed, wherein the coupling movement is elastically delayed and thus mechanically damped.

FIG. 6 shows another embodiment in which, for the mechanical damping of the coupling movement of the coupling element 1, a plate spring is provided. This is arranged coaxial with its elastic radial inner edge 9 in the coupling path of the end area 11 of the coupling element 1. Here, the plate spring is supported on the inner lever. Simultaneously, the restoring spring 12 of the coupling element 1 is supported on the side of the plate spring facing away from the inner lever. The plate spring is here positioned such that, on its radial inner elastic edge 9 projecting freely against the coupling direction in the coupling path, the coupling element 1 impacts on the end area 11 during coupling shortly before the coupling element 1 reaches the contact point in contact with the coupling face 3 of the outer lever. Here, the plate spring is compressed in the coupling direction 2 and the coupling movement is elastically delayed for damping in the contact phase with the outer lever.

In the construction according to FIG. 7, a bow spring is provided that is fixed on the outer surface of the outer lever and has an elastic free end section 11 arranged in the coupling path transverse to the coupling direction 2. Here, this is provided opposite the coupling direction 2 in the coupling path of the coupling element 1, so that the coupling element 1 impacts on the outer lever with its front end during coupling shortly before contact with the coupling face 3 and the coupling movement is elastically delayed on the bow spring.

Figure 8:
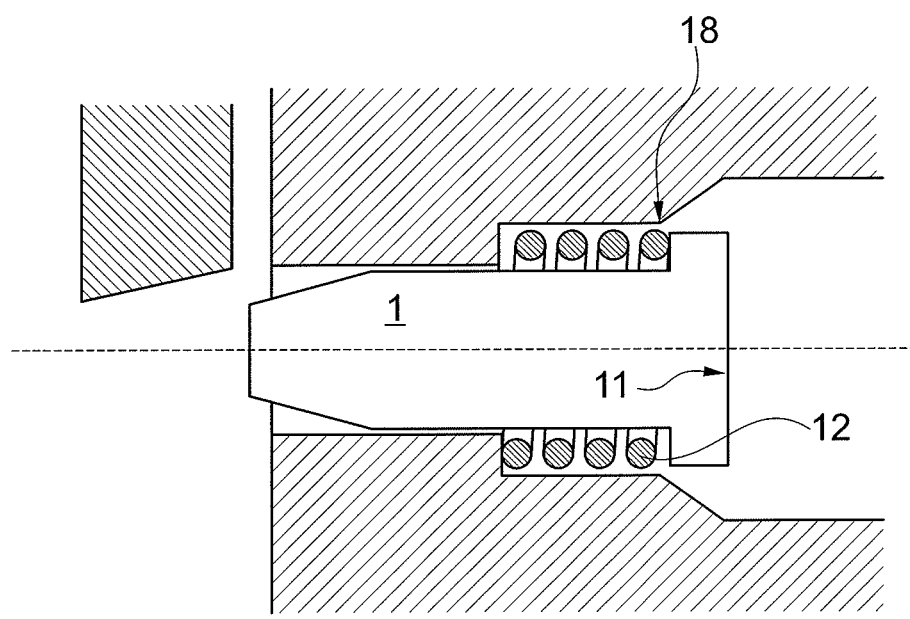
FIG. 8 is a section diagram of an arrangement according to the invention in an eighth embodiment.

In FIG. 8, a throttle section 18 is provided on the inner lever on the end of the end of the holder facing the end area 11 in the coupling path of the piston-shaped end area 11 of the coupling element 1. On the throttle section 18, the distance between the inner lever and coupling element 1 is reduced transverse to its movement direction. In this way, the cross-sectional flow of the pressurized medium flow emerging during coupling from the holder due to the displacement effect of the coupling element 1 is reduced and a throttle effect is achieved. During coupling in the contact phase with the outer lever, this generates a resistance through which the movement of the coupling element 1 is delayed. In a wedge-shaped or conical transition area of the throttle section 18, the cross-sectional flow tapers in the coupling direction to the minimum required gap width for holding the restoring spring 12.

LIST OF REFERENCE SYMBOLS

1 Coupling element
2 Coupling direction
3 Coupling face
4 Outer cone
5 Guide section
6 Guide section
7 Damping element
8 Ring
9 Edge
10 End section
11 End area
12 Return spring
13 Rounding
14 Recess
15 Groove
16 Ring
17 Helical compression spring
18 Throttle section

The invention claimed is:

1. An arrangement for coupling first and second components of an internal combustion engine that are arranged movable relative to each other, comprising at least one coupling element that is arranged movable in the first component for coupling with the second component to be coupled, wherein at a contact point between the coupling element and the second component, a force acting on the coupling element during coupling is adapted to be introduced directed at an angle to a coupling direction of the coupling element; and,
the coupling element has first and second parts that are guided movable relative to each other on respective guide sections and a damping element is arranged in a flow of forces between the first and second parts for transferring the coupling movement, the first and second parts are both movable in the coupling direction for coupling the first component with the second component, with the damping element adapted to damp a contact force between the first part and the second component, and the first and second parts are both movable in a release direction for uncoupling the first and second components.

2. The arrangement according to claim 1, wherein the second component to be coupled has, at the contact point, a flat coupling face oriented inclined at an angle to the coupling direction.

3. The arrangement according to claim 1, wherein the coupling element has, at the contact point, an outer cone tapering in the coupling direction.

4. The arrangement according to claim 1, wherein the coupling element is constructed rounded at the contact point in the coupling direction.

5. The arrangement according to claim 1, wherein in a contact phase with the second component, for the hydraulic damping of a coupling movement of the coupling element that is adapted to be actuated by pressurized medium and arranged in the first component, a cross-sectional flow area for the pressurized medium flow emerging between the coupling element and the first component during the coupling is narrowed section by section.

6. The arrangement of claim 1, wherein the first and second components are components for switching multi-stage valve drives in an internal combustion engine.

7. An arrangement for coupling first and second components of an internal combustion engine that are arranged movable relative to each other, comprising at least one coupling element that is arranged movable in the first component for coupling with the second component to be coupled, wherein at a contact point between the coupling element and the second component, a force acting on the coupling element during coupling is adapted to be introduced directed at an angle to a coupling direction of the coupling element; and,
at least one elastically pliant stop is provided in the coupling direction for mechanical damping of the coupling movement of the coupling element in a contact phase with the second component.

8. The arrangement according to claim 7, wherein the stop is constructed as a movable ring that is arranged coaxial in a coupling path of the coupling element and is spring-loaded in the coupling direction.

9. The arrangement according to claim 7, wherein the stop is formed by an elastic edge of at least one plate spring arranged coaxial in a coupling path of the coupling element.

10. The arrangement according to claim 7, wherein the stop is formed by an elastic, free end section of at least one bow spring connected rigidly to the second component, wherein the free end section is arranged in a coupling path of the coupling element.

* * * * *